Aug. 8, 1961     J. M. JACKSON, JR     2,994,985
COVERED CUT FLOWER HOLDER

Filed Dec. 23, 1959     2 Sheets-Sheet 1

*INVENTOR.*
JAMES M. JACKSON, JR.

BY *Ely, Frye & Hamilton*

ATTORNEYS

Aug. 8, 1961     J. M. JACKSON, JR     2,994,985
COVERED CUT FLOWER HOLDER
Filed Dec. 23, 1959     2 Sheets-Sheet 2
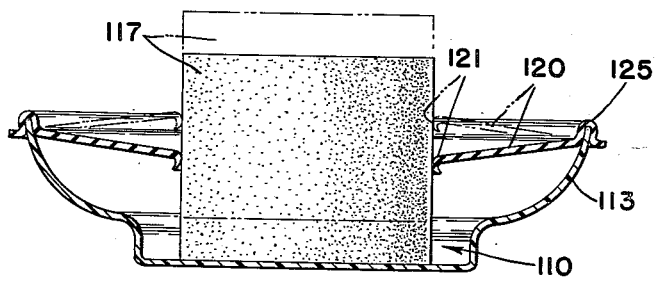
FIG. 4
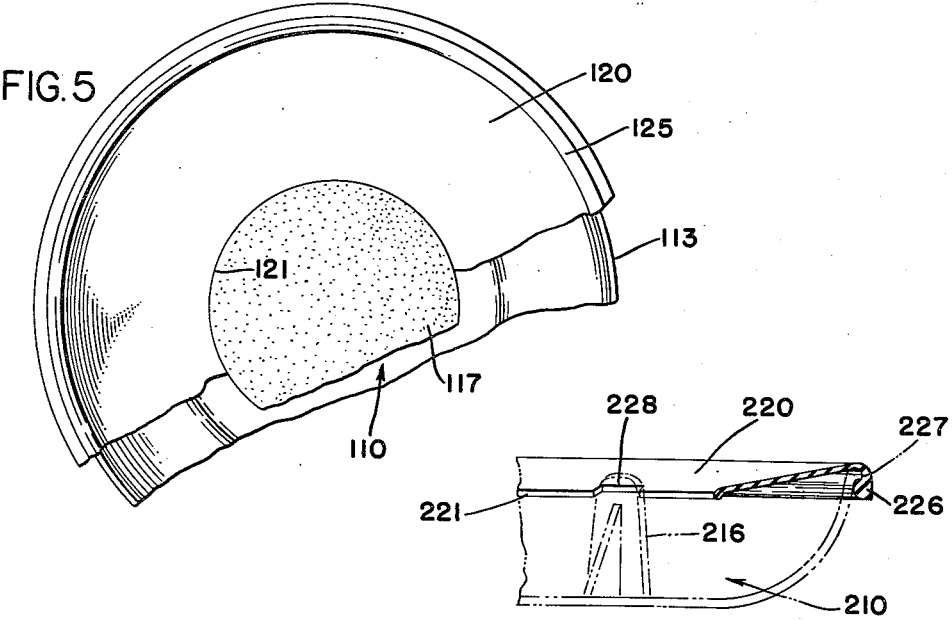
FIG. 5
FIG. 6
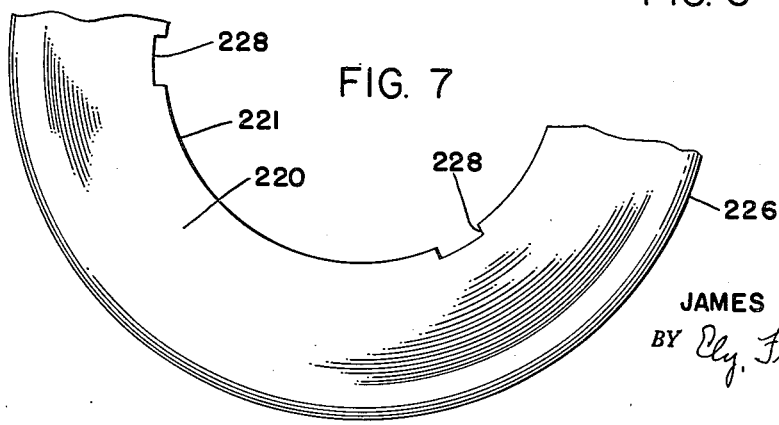
FIG. 7
INVENTOR.
JAMES M. JACKSON, JR.
BY
ATTORNEYS

2,994,985
COVERED CUT FLOWER HOLDER

James M. Jackson, Jr., Akron, Ohio, assignor to The V. L. Smithers Manufacturing Company, Kent, Ohio, a corporation of Ohio
Filed Dec. 23, 1959, Ser. No. 861,515
6 Claims. (Cl. 47—41)

The invention relates to a flower holder for decorative and display purposes having a block of water-absorbent and retentive material supported and firmly held within a saucer-like base so that stems of cut flowers inserted in the block will be held in a desired arrangement and supplied with moisture from the block of material. Such a holder is disclosed in the co-pending application of Vernon L. Smithers, Serial No. 689,332, filed October 10, 1957, now Patent No. 2,922,254, and the present invention is an improvement thereon.

In using the holder of said application Serial No. 689,332, the saucer-like base usually contains excess water which has oozed out of the block or is supplied to supplement the water retained in the block as it is consumed by the flowers. In transporting the holder from place to place, especially when flowers are held therein, the tendency to spill the excess water is very great, causing damage to highly finished table tops, doilies and the like placed under the holder, etc. Moreover, the excess water is subject to rapid evaporation.

The present invention comprises providing a cover for the holder which not only overcomes these disadvantages but also exposes the top and a substantial amount of the side wall of the block to make it accessible for the insertion of flower stems for a large variety of floral arrangements.

Another object of the present invention is to provide an improved covered flower holder which will prevent spillage of excess water within the base, and greatly retard evaporation of said excess water, thereby prolonging the time that a flower arrangement in the holder is kept fresh.

Another object is to provide an improved flower holder having a cover which drains surface moisture inwardly to the water-absorbent block of foam.

A further object is to provide a covered flower holder for a block of absorbent foam which accomplishes the foregoing objectives and at the same time allows easy insertion of the block and locks it in place.

These objects, and others which will appear from the following description, are attained by providing a flower holder having a cover preferably of somewhat flexible material fitting the upper rim of the saucer-like base and sloping radially inward to a central opening adapted for fitting tightly around the outer surface of the block well below its top surface, said central opening becoming smaller when the cover is distorted to a flat planar position, thereby resisting removal of the block.

The present invention is hereinafter described in detail and preferred embodiments are shown by way of example in the accompanying drawings. Other variations in construction and modifications are included within the scope of the subjoined claims.

Referring to the drawings:

FIG. 4 is a vertical sectional view of another embodiment of the invention, showing how the cover is distorted to remove the block.

FIG. 5 is a fragmentary plan elevation of the embodiment of FIG. 4.

FIG. 6 is a fragmentary view of still another embodiment, showing the cover in section.

FIG. 7 is a fragmentary plan elevation of the cover of FIG. 6.

Figure 1:
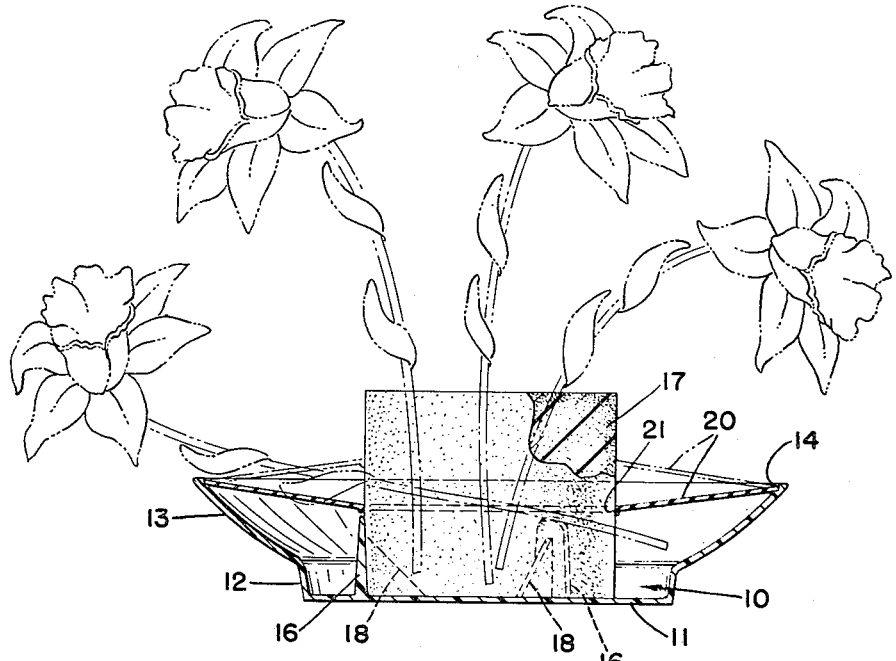
FIG. 1 is a vertical sectional view of one embodiment of the improved covered holder, showing the manner in which flowers are held in the block of absorbent foam and the block held in place by the cover.
Figure 3:
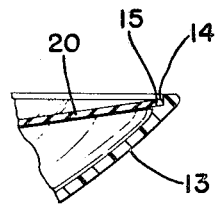
FIG. 3 is an enlarged fragmentary section similar to FIG. 1, showing the joint between the cover and the rim of the base.
Figure 2:
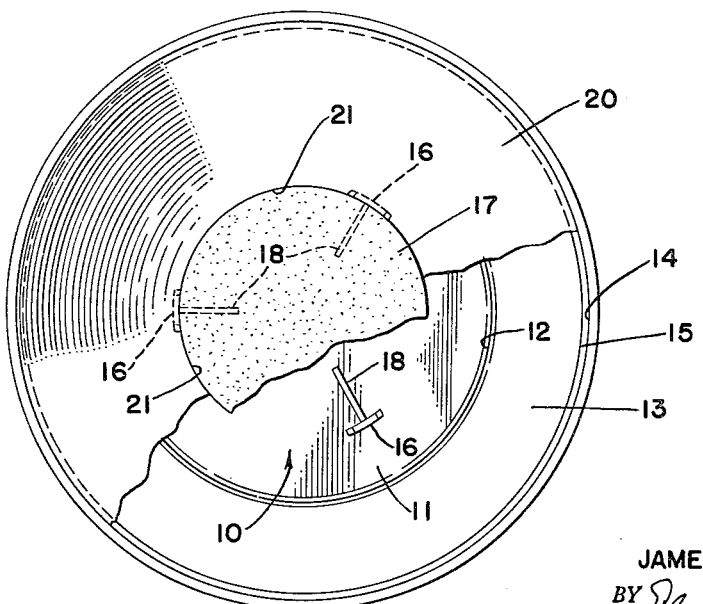
FIG. 2 is a plan elevation thereof, partly broken away.

Referring to FIGS. 1–3, the saucer-like base preferably includes a central well or basin 10 having a flat bottom wall 11 and an annular side wall 12. The side wall 12 diverges upwardly and outwardly to form a curved rim portion 13 having an annular recess 14 forming a shoulder 15 at its outer edge.

The bottom wall 11 may have a plurality of circumferentially arranged upstanding ribs 16, three being shown, although the number may be varied. These ribs are positioned radially outward of the center of bottom wall 11 so as to engage and position a block 17 of crushable moisture-retentive foam material centrally of the base. Preferably, tapered radial ribs 18 extend inwardly from the upright ribs 16, so that when the block 17 is pushed downwardly within ribs 16, the tapered ribs 18 will crush and become embedded into the lower corner portions of the block of foam.

The material of which the base and ribs are formed may be any one of a number of conventional materials, such as synthetic resins, which can be injection or compression molded. Examples are rigid or semi-rigid polyethylenes or polyvinyls, polystyrenes or members of the acrylic class.

The material of which the block is formed may be foamed synthetic resin material such as a phenol formaldehyde foam, although other foams such as urea formaldehyde foams could be used. The foam must be capable of being moisture-absorbent and moisture-retentive and to be crushable to an extent of receiving and yet supporting the stems of flowers in desired arrangements.

In using phenol formaldehyde foam, phenol formaldehyde resin in liquid form is supplied by the manufacturer in graduated viscosities. A batch of any convenient size is measured out, it being preferable to secure the desired viscosity by mixing measured amounts of selected viscosities, depending upon the density of the foam which is to be made. To the batch is added a foaming agent and a small amount of an agent which will impart a suitable degree of softness and slight resilience to the finished product. The proportioning of the heavy and lighter resins and the use of a softening agent is within the skill of one familiar with this art and need not be set forth in detail.

The mass or block of foam formed in the manner described is a very poor water absorbent unless aided in some manner. In order that the material forming the base be water-retentive and in order to ensure that the block will absorb and retain water, the exterior of the block may be treated with a wetting agent which will promote the absorption and retention of the water. For this purpose, any of the well-known wetting agents such, for example, as those described in U.S. Patent No. 2,753,277 of July 3, 1956, may be employed.

The blocks 17 are usually cut from larger blocks of the foamed material, made as described above or from similar materials familiar to those versed in the art. Each block 17 is cut so as to fit snugly within the upright ribs 16, and the cut block may then be treated with a wetting agent on all surfaces. The block is preferably saturated with water before being inserted into the holder.

The cover is an annular disk 20 having its outer edge fitting in the annular recess 14 and resting on the shoulder 15, and its inner beaded edge 21 defines an opening fitting tightly around and against the outer surface of the block with the disk normally sloping inwardly or radially downward from its outer edge to the inner edge. The disk may be made of the same or similar material to that of the base, and is preferably flexible.

When the saturated block is pushed downwardly through the opening formed by edge 21 and the tapered ribs embed themselves into the block, the frictional engagement of the inner edge of the cover disk 20 with the block holds the disk in its inwardly sloping position shown in FIG. 1, and any surface moisture on top of the disk will drain into the block. The cover will be substantially sealed to the base at the recess 14, and at its inner edge to the block 17, so that excess water within the base will be prevented from spilling as the holder is moved about, and evaporation of said excess water will be greatly retarded due to lack of exposure to the atmosphere. Further, as shown in FIG. 1, flower stems may be laid substantially flat on the cover and pushed through the block to engage under the opposite inner edge of the cover, thus helping to stabilize and hold the block in place.

By forming the edge 21 to fit snugly around the block when the cover slopes radially inwardly downward, the cover acts to lock the block in place, because upward withdrawal of the block tending to distort the cover to a horizontal flat plane causes the opening formed by edge 21 to become smaller and the edge to crush into the block all around its periphery. Thus, removal of the block requires distorting the cover from its normally inwardly downward slope past the horizontal position to an inwardly upward slope, as indicated in phantom lines in FIG. 1. In its normal position, the inner edge of the cover is positioned over and closely adjacent to the upper ends of ribs 16.

In the embodiment shown in FIGS. 4 and 5, the outer edge of cover 120 overlaps the upper edge of rim portion 113 of basin 110, and is formed in an upwardly directed annular fold 125 which fits resiliently over and frictionally grips the upper edge of the rim.

The basin 110 preferably does not have any ribs to be embedded in the block of foam 117, and the edge 121 forming the central opening in the cover 120 is in the form of a downturned bead engaging the peripheral surface of the block 117. Removal of the block requires distortion of the cover to the position shown in phantom in FIG. 4, and when the cover passes into the flat horizontal position the edge 121 is embedded into the block and tends to lock the block against withdrawal.

The cover 220 shown in FIGS. 6 and 7 is similar in construction to the covers 20 and 120, except that it has a downturned bead 226 around its outer edge for resiliently fitting over and engaging under a similar bead 227 on the outer rim of a basin indicated in phantom at 210. As indicated, the inner edge 221 of the cover may have notches 228 for receiving the tops of ribs 216 rising from the bottom wall of the basin.

In all embodiments the improved covered flower holder prevents spillage of excess water and reduces evaporation thereof, while providing means for locking a block of moisture absorbent foam in accessible position for holding the stems of flowers in a variety of arrangements.

What is claimed is:
1. A cut flower holder comprising a basin having a base and an outer rim, a block of water-absorbent and retentive crushable material normally resting on said base, and an annular cover having its outer edge engaging said outer rim and its inner edge engaging said block, said cover normally sloping inwardly downward to said inner edge and being distortable to an inwardly upward slope for removing the block.

2. A cut flower holder comprising a basin having a base and an outer rim, a block of water-absorbent and retentive crushable material normally resting on said base, an annular cover having its outer edge engaging said outer rim and its inner edge engaging said block, said cover normally sloping inwardly downward to said inner edge and being distortable to an inwardly upward slope for removing the block, and circumferentially arranged ribs rising from the base and engaging the outer periphery of the block.

3. A cut flower holder comprising a basin having a base and an outer rim, a block of water-absorbent and retentive crushable material normally resting on said base, and an annular cover having its outer edge engaging said outer rim and its inner edge engaging said block, said cover normally sloping inwardly downward to said inner edge and being distortable to an inwardly upward slope for removing the block, and radial ribs rising from said base and embedded into the bottom portion of said block.

4. A cut flower holder comprising a basin having a base and an outer rim, a block of water-absorbent and retentive material resting on said base, an annular cover having its outer edge engaging said outer rim and its inner edge engaging and conforming to the outer periphery of said block substantially below its top surface, said cover normally sloping inwardly downward to said inner edge, and radial ribs rising from said base and embedded into the bottom portion of said block.

5. A cut flower holder having a base with an upwardly diverging rim portion terminating in an outer edge, a block of water-absorbent and retentive crushable material normally resting on said base, and an annular cover of distortable material having its outer edge in sealing engagement with the outer edge of said rim portion and its inner edge engaging and conforming to the outer peripheral surface of the block substantially below its top surface, said cover normally sloping inwardly downward to its inner edge and being distortable to an inwardly upward slope for removing the block.

6. A cut flower holder having a base with an upwardly diverging rim portion terminating in an outer edge, a block of water-absorbent and retentive crushable material normally resting on said base, said block being formed of a foamed synthetic resin, and an annular cover of distortable material having its outer edge in sealing engagement with the outer edge of said rim portion and its inner edge engaging and conforming to the outer peripheral surface of the block substantially below its top surface, said cover normally sloping inwardly downward to its inner edge and being distortable to an inwardly upward slope for removing the block.

References Cited in the file of this patent
UNITED STATES PATENTS 2,922,254    Smithers _____ Jan. 26, 1960

FOREIGN PATENTS 8,767    Great Britain _____ 1909